United States Patent [19]
Sievers

[11] Patent Number: 5,407,048
[45] Date of Patent: Apr. 18, 1995

[54] HIGH PERFORMANCE AUTOMOTIVE CLUTCH ASSEMBLY

[76] Inventor: George K. Sievers, 1605 W. Magnolia Blvd., Burbank, Calif. 91506

[21] Appl. No.: 99,723

[22] Filed: Jul. 29, 1993

Related U.S. Application Data

[63] Continuation-in-part of Ser. No. 59,076, May 4, 1993, abandoned.

[51] Int. Cl.⁶ ............... F16D 69/00; B05D 5/00
[52] U.S. Cl. ............... 192/70.14; 192/107 M; 427/456
[58] Field of Search ............... 192/70.14, 107 M; 427/456; 188/218 XL, 251 R, 251 M

[56] References Cited

U.S. PATENT DOCUMENTS

| | | | |
|---|---|---|---|
| 3,584,718 | 6/1971 | Schiefer et al. | 192/70.14 |
| 3,848,313 | 11/1974 | Guyonnet | 192/107 M X |
| 4,013,453 | 3/1977 | Patel | 427/456 X |
| 4,290,510 | 9/1981 | Warren | 192/107 M X |
| 4,715,486 | 12/1987 | Burgdorf et al. | 192/107 M |
| 4,815,572 | 3/1989 | Froberg et al. | 188/251 M |
| 4,846,329 | 7/1989 | Kettell et al. | 192/107 M |
| 5,019,429 | 5/1991 | Moskowitz et al. | 427/455 X |
| 5,019,686 | 5/1991 | Marantz | 427/446 X |
| 5,053,261 | 10/1991 | Nishimura et al. | 188/251 M X |
| 5,075,129 | 12/1991 | Jackson et al. | 427/451 |
| 5,103,942 | 4/1992 | Schmitt | 188/251 M X |
| 5,184,704 | 2/1993 | Hays | 192/107 M X |

Primary Examiner—Rodney H. Bonck
Attorney, Agent, or Firm—Louis J. Bachand

[57] ABSTRACT

High performance clutch assembly having a refractory metal carbide thermal spray coated onto the clutch disc engagement surfaces and method.

16 Claims, 1 Drawing Sheet

HIGH PERFORMANCE AUTOMOTIVE CLUTCH ASSEMBLY

REFERENCE TO RELATED APPLICATIONS

This application is a continuation in part of application Ser. No. 08/059,076, filed May 4, 1993, and now abandoned, the disclosure of which is incorporated herein by this reference.

TECHNICAL FIELD

This invention has to do with automotive clutch assemblies and more particularly with such assemblies in which the engagement surfaces of the clutch disc are coated with a refractory metal carbide, particularly with a thermal-sprayed high velocity tungsten carbide, chromium carbide or titanium carbide coating.

BACKGROUND OF THE INVENTION

Automotive clutch assemblies employ a movable clutch disc to selectively engage the clutch flywheel and transmit power to the drive wheels. In high performance applications, such as race vehicles, the immediate, positive, persistent and durable engagement of the clutch disc and flywheel is vital to effective transmission of power to the wheels and of course successful racing. It is not uncommon for clutch discs, typically formed of wear resistant metals to be frequently replaced as their ability to firmly engage decreases with use, owing to excessive wear of the engaging surfaces, primarily the engagement surfaces of the clutch disc which may comprise a band on the face of the disc opposed to the flywheel, or a circumferentially extended series of pads superimposed the disc face. Excessive wear adversely affects intended contact with the flywheel and reduces the clutch effectiveness. The cost of replacement of clutch discs is significant for even high budget racers.

SUMMARY OF THE INVENTION

It is an object therefore of the present invention to provide an improved automotive clutch assembly. It is another object to provide an improved clutch disc for an automotive clutch assembly. It is another object to provide a highly abrasive and wear resistant coating on clutch discs and clutch disc pads to enable faster, more durable and otherwise better engagement of the clutch disc with the flywheel.

These and other objects to become apparent hereinafter are realized in accordance with the invention in a high performance automotive clutch assembly having a flywheel, a clutch disc having predetermined surfaces for engagement with the flywheel, and a pressure plate arranged to urge the clutch disc toward the flywheel, wherein there is provided the improvement comprising a refractory metal carbide coating on the disc predetermined surfaces.

In this and like embodiments, typically, the refractory metal carbide coating comprises tungsten carbide or chromium carbide, the coating is 0.005 to 0.050 inch thick, the predetermined surfaces comprise a continuous surface or discontinuous surface comprising a plurality of individually replaceable pads arranged circumferentially on the clutch disc, and the refractory metal coating comprises tungsten carbide, chromium carbide or titanium carbide and from 6 to 18% by weight nickel, cobalt or nickel-cobalt binder.

In another embodiment, the invention provides a high performance clutch assembly comprising a flywheel having predetermined surfaces for engagement with the clutch disc, and a pressure plate arranged to urge the clutch disc toward the flywheel, the clutch disc predetermined surfaces comprising a refractory metal coating of a refractory metal carbide and a nickel, cobalt or nickel-cobalt binder.

In this and like embodiments, typically, the clutch disc predetermined surfaces are discontinuous and comprise discrete pads carried on the clutch disc opposite the flywheel, the refractory metal coating comprises tungsten carbide, chromium carbide or titanium carbide, the binder is present in the coating in an amount from 6 to 18% by weight, the refractory metal carbide is tungsten carbide, the binder is present in a weight amount of about 9%, and the coating has a thickness of one-half mil to 50 mils.

The invention further contemplates the method of preparing a high performance clutch assembly using high velocity thermal spray, which includes thermal spraying the clutch disc engagement surfaces with a coating of refractory metal carbide having a particle size between 10 and 33 microns, at rates from 1 to 20 pounds per hour and velocities above 730 meters per second.

The method further preferably includes selecting chromium carbide or titanium carbide as the refractory metal carbide, selecting cobalt, nickel or nickel-cobalt as a binder for the tungsten carbide, and coating the engagement surfaces to a thickness of one-half mil to 50 mils.

BRIEF DESCRIPTION OF THE DRAWING

The invention will be further described in conjunction with the attached drawing, in which:

The single FIGURE is an exploded view of an automotive clutch assembly according to the invention.

DETAILED DESCRIPTION

Figure 1:
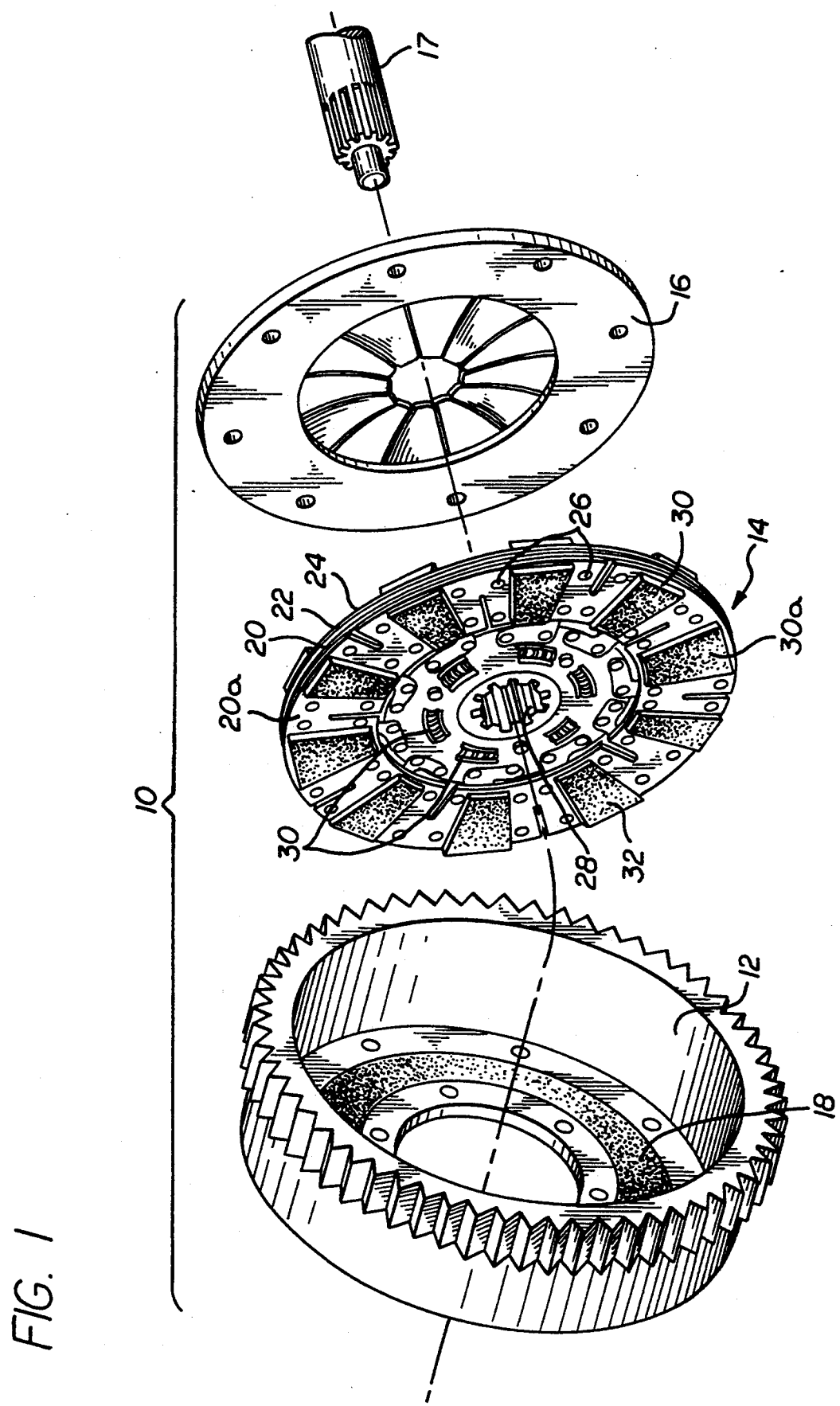

With reference now to the drawing in detail, the automotive clutch assembly 10 comprises flywheel 12, clutch disc 14, and pressure plate 16 (pins, springs and bell housing having been omitted for clarity), the clutch plate being adapted for splined engagement with transmission output shaft 17.

The flywheel 12 may be of any type and is typically made of steel or aluminum and may have a sintered bronze or steel heat shield 18 against undue wear from clutch disc engagement. The pressure plate also may be of any type and suitable material.

The clutch disc 14 is of any design suited to the flywheel 12 and pressure plate 16 and typically will comprise one or more concentric plates 20, 22 and 24 fastened with a series of rivets 26, a splined hub 28 and a circular series of springs 30. Friction materials defining the engagement surfaces of clutch discs have in the past been selected from metals, organic brass composites, and fiberglass.

In the present invention, the clutch disc 14 is provided on its engagement surface, either the face 20a of plate 20 or face 30a as shown on pads 30 opposite the flywheel 12, with a refractory metal carbide coating 32. Such refractory metal carbide coatings 32 as tungsten carbide, chromium carbide and/or titanium carbide in a suitable binder such as cobalt, nickel or nickel-cobalt, e.g. at 6 to 18% by weight binder and the balance carbide, and preferably about 9% cobalt, nickel or nickel-cobalt binder and the balance the mentioned carbide have been found to afford numerous high performance advantages and to wear less than other systems.

The use of such refractory metal carbide coatings 32 has been found to improve immediate engagement of the clutch disc 14 with the flywheel 12 for faster application of engine power to the wheels, to reduce glazing which can increase slippage, and to reduce wear of the clutch disc engagement surfaces 20a, 30a, so that optimum clutch adjustment is more easily maintained for maximum race performance.

It is preferred to employ refractory metal carbide coatings 32 which have been applied by high velocity techniques of thermal spraying, e.g. under conditions of carbide particle size between 10 and 33 microns, rates of spray of from 1 to 20 pounds per hour and velocities above 730 meters per second. Use of tungsten carbide in a cobalt, nickel or nickel-cobalt binder, and application to a coating thickness one-half mil to 50 mils is further preferred.

The result of use of refractory metal carbide on the engagement surfaces of an automotive clutch assembly is vastly improved resistance to wear, improved friction engagement and higher performance from any design of clutch assembly.

I claim:

1. In a high performance automotive clutch assembly having a flywheel, a clutch disc having predetermined surfaces for engagement with said flywheel, and a pressure plate arranged to urge said clutch disc toward said flywheel, the improvement comprising a refractory metal carbide coating on said disc predetermined surfaces, said flywheel and pressure plate being free of said coating opposite said predetermined surfaces.

2. The automotive clutch assembly according to claim 1, in which said refractory metal coating comprises tungsten carbide, chromium carbide or titanium carbide.

3. The automotive clutch assembly according to claim 1, in which said coating is 0.005 to 0.050 inch thick.

4. The automotive clutch assembly according to claim 1, in which said predetermined surfaces comprise a plurality of individually replaceable pads arranged circumferentially on said clutch disc.

5. The automotive clutch assembly according to claim 1, in which said refractory metal coating comprises tungsten carbide, chromium carbide or titanium carbide, and from 6 to 18% by weight nickel, cobalt or nickel-cobalt binder.

6. High performance clutch assembly comprising a flywheel, a clutch disc having predetermined surfaces for engagement with said flywheel, and a pressure plate arranged to urge said clutch disc toward said flywheel, said clutch disc predetermined surfaces comprising a refractory metal coating of a refractory metal carbide and a nickel, cobalt or nickel cobalt binder, said flywheel and pressure plate being free of said coating opposite said predetermined surfaces.

7. The high performance clutch assembly according to claim 6, in which said clutch disc predetermined surfaces are discrete pads carried on said clutch disc opposite said flywheel.

8. The high performance clutch assembly according to claim 7, in which said refractory metal coating comprises tungsten carbide, chromium carbide or titanium carbide.

9. The high performance clutch assembly according to claim 8, in which said binder is present in said coating in an amount from 6 to 18% by weight.

10. The high performance clutch assembly according to claim 9, in which said refractory metal carbide is chromium carbide.

11. The high performance clutch assembly according to claim 10, in which said binder is present in a weight amount of about 9%.

12. The high performance clutch assembly according to claim 11, in which said coating has a thickness of one-half mil to 50 mils.

13. Method of preparing a high performance clutch assembly having a flywheel, a pressure plate and a clutch disc, including thermal spraying the clutch disc engagement surfaces with a coating of refractory metal carbide having a particle size between 10 and 33 microns, at rates from 1 to 20 pounds per hour and velocities above 730 meter per second without spraying said flywheel and said pressure plate with said refractory metal carbide.

14. The method according to claim 13, including also selecting tungsten carbide, chromium carbide or titanium carbide as said refractory metal carbide.

15. The method according to claim 14, including also selecting cobalt, nickel or nickel-cobalt as a binder for said carbide.

16. The method according to claim 15, including also coating said engagement surfaces to a thickness of one-half mil to 50 mils.

* * * * *